UNITED STATES PATENT OFFICE.

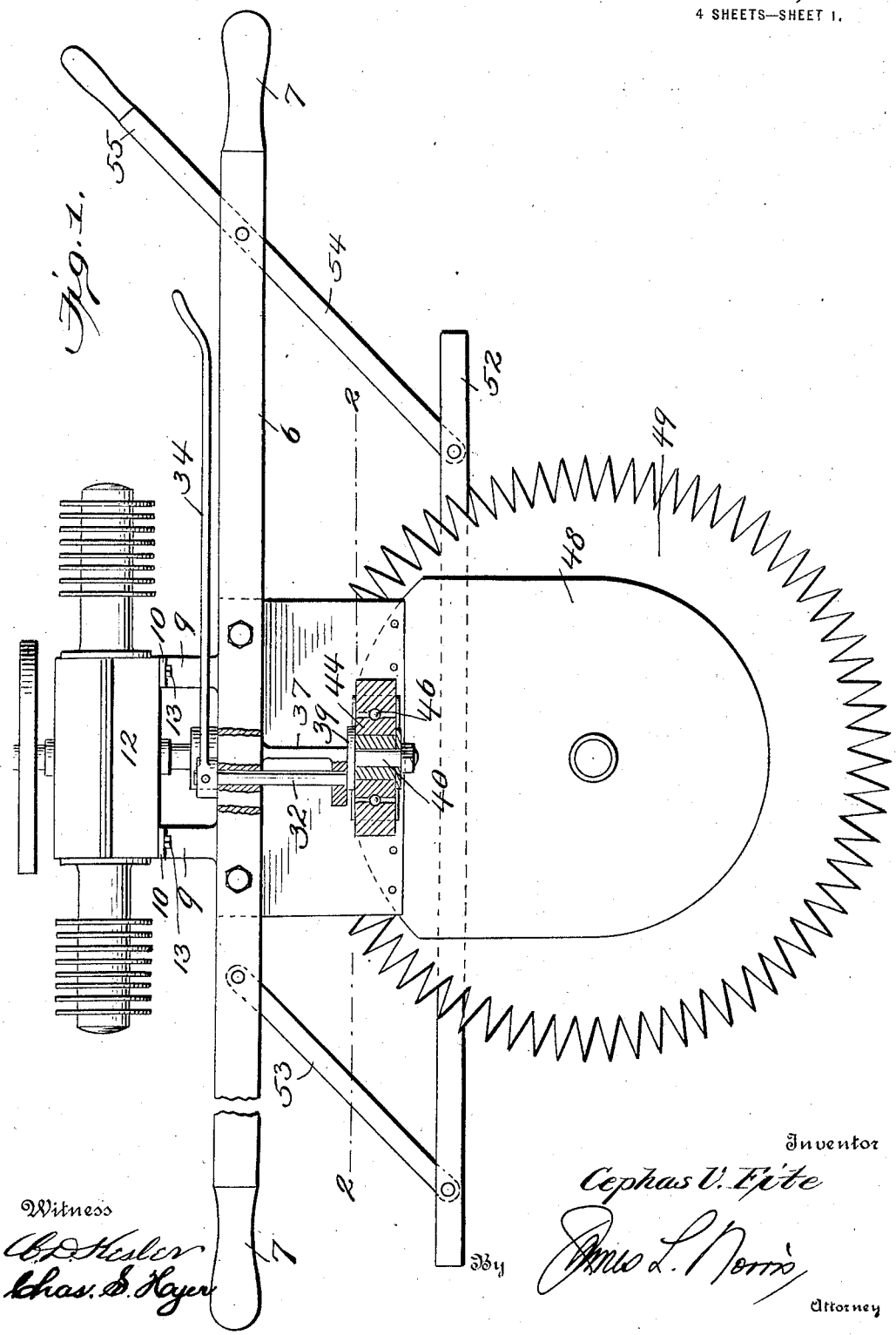

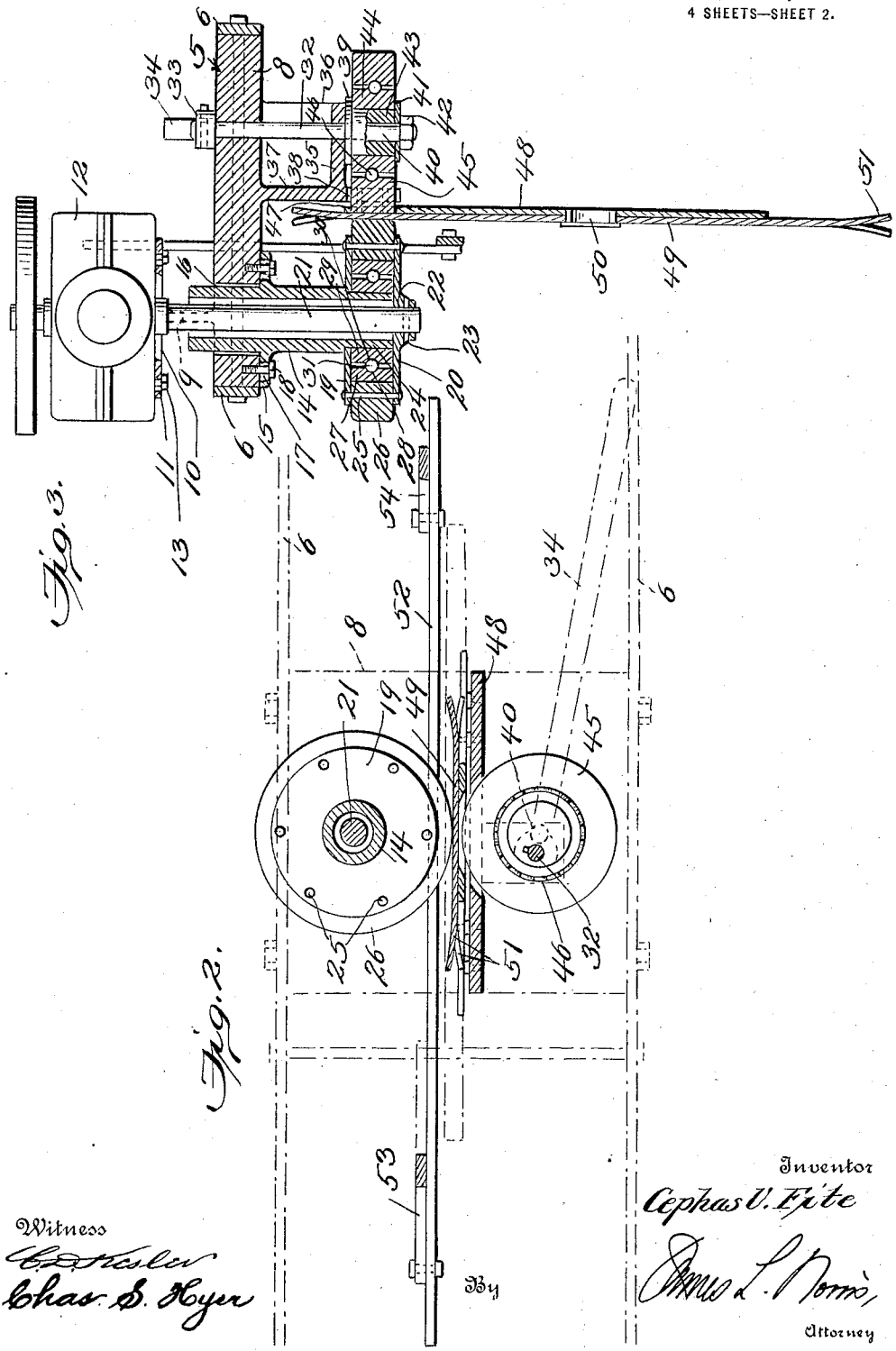

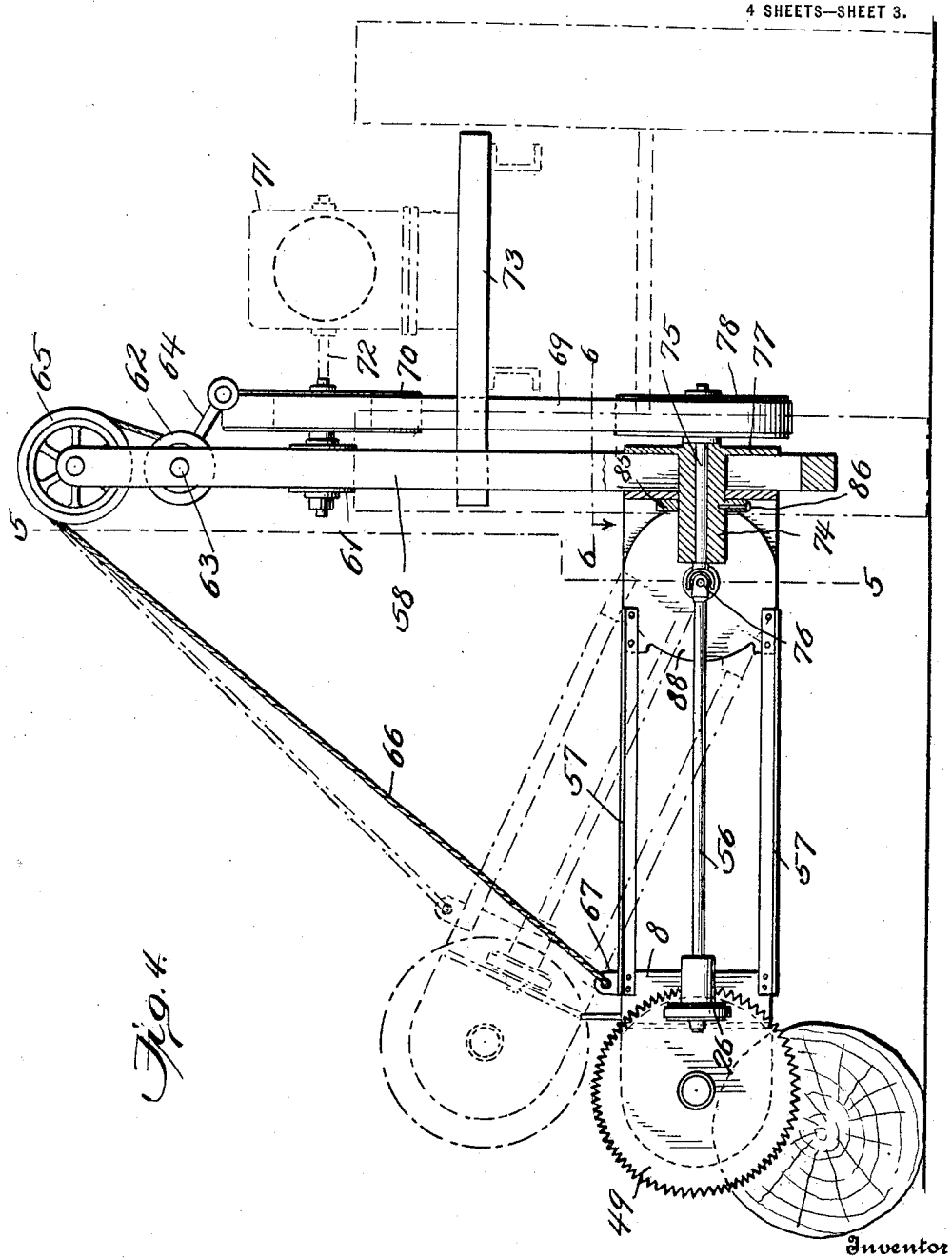

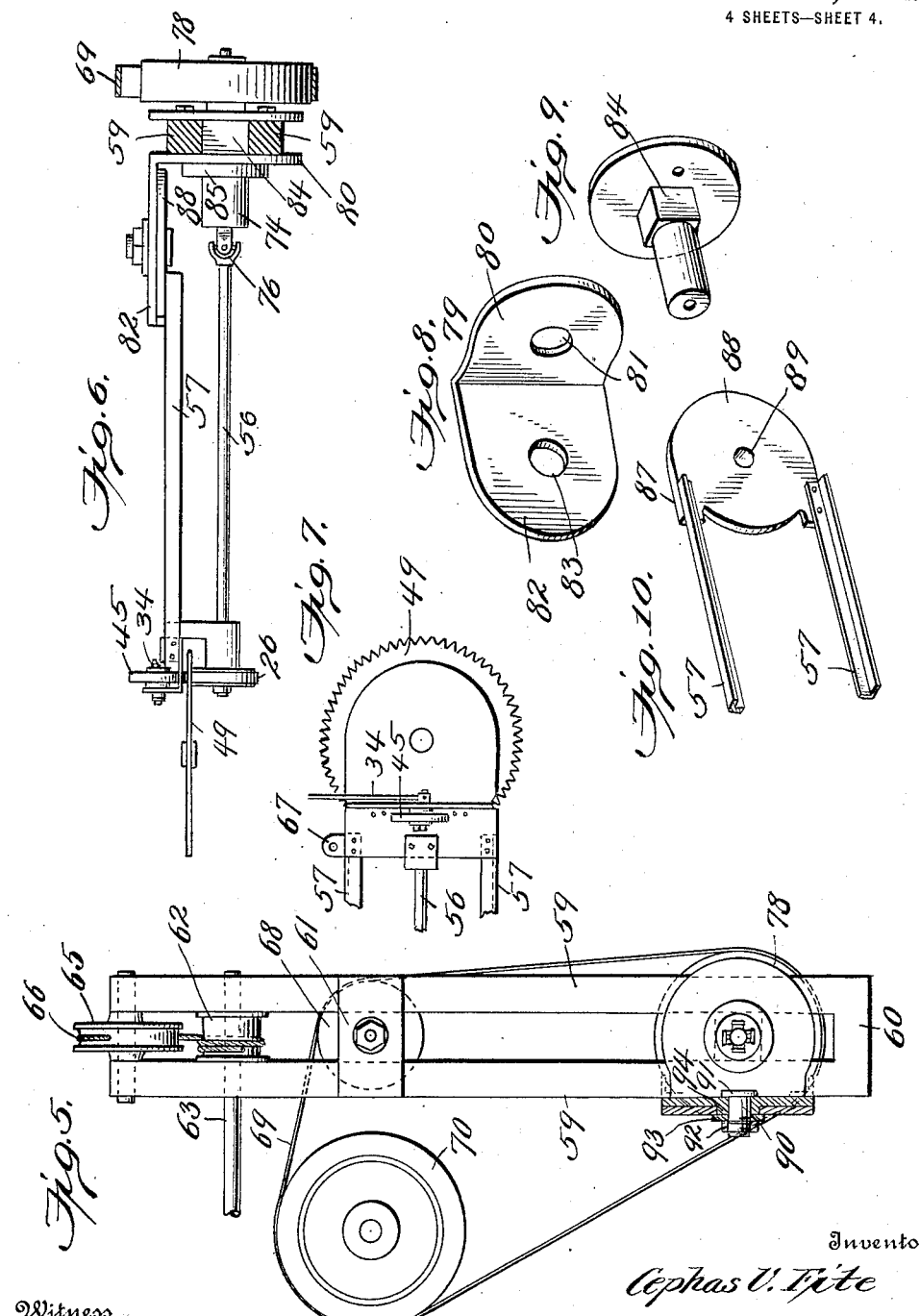

CEPHAS V. FITE, OF CHARLOTTE, NORTH CAROLINA.

SAWING APPARATUS.

1,395,100.  Specification of Letters Patent.  Patented Oct. 25, 1921.

Application filed February 12, 1918. Serial No. 216,743.

*To all whom it may concern:*

Be it known that I, CEPHAS V. FITE, a citizen of the United States, residing at Charlotte, in the county of Mecklenburg and State of North Carolina, have invented new and useful Improvements in Sawing Apparatus, of which the following is a specification.

This invention relates to wood-sawing apparatus of a portable type adapted for cutting down and trimming timber, sawing timber into readily transportable lengths, and otherwise sawing or cutting timber as may be desired.

The improved sawing apparatus or mechanism may be directly equipped with a motor and manually transported from one point to another and be easily moved to different locations in a timber tract, or, it may be applied to a traction engine, automobile or other motor vehicle and be connected up to and driven or operated from or by such engine or vehicle. In one of its forms the improved apparatus embodies a saw that may be quickly adjusted from a vertical to a horizontal cutting position or vice versa, and in the several forms of the apparatus means are provided to regulate the depth of cut of the saw relatively to its support to accommodate timber differing in diameter and obviate injury to the saw by preventing it from striking the ground or other injurious objects that may be located below or at the base of the timber cut.

One of the principal objects of the present improved sawing apparatus is to operatively expose the greatest possible area of saw blade relatively to the timber cut, and particularly in cutting timber of large diameter, through the medium of a novel form of saw support or hanger which has a thickness less than the lateral set of the saw teeth and whereby the saw kerf formed will be wide enough to permit the combined saw blade and a portion of the saw support or hanger to enter the cut made without the least obstruction. Another particular object of the invention is to provide for the use with a complete disk or circular saw of a frictional driving means engaging the same near the periphery or teeth, or, at a point most effective in operating the saw during its cutting action and, in addition, to employ a friction sustaining eccentric engaging the saw blade directly opposite the frictional driving means and readily adjustable to modify the frictional effect of said driving means. A further object of the invention is to generally increase the efficiency and convenience in operation of portable sawing apparatus and adapt the same to various cutting applications incident to the primal preparation of lumber in forests and also in erecting buildings, bridges and other structures.

The invention consists in the preferred construction and arrangement of parts which will be more fully hereinafter described and claimed.

In the drawings:—

Figure 1 is a side elevation, partially broken away and in section, of a manually portable form of saw apparatus carrying a motor device and embodying the features of the invention.

Fig. 2 is a horizontal section taken in the plane of the line 2—2, Fig. 1, parts being shown in dotted lines.

Fig. 3 is a transverse vertical section of the apparatus shown by Fig. 1 taken through the center of the saw blade.

Fig. 4 is a side elevation, partially in section, of another form of the apparatus shown applied to a tractor or motor vehicle shown in dotted lines, the adjustment of a portion of the improved apparatus being indicated by dotted lines.

Fig. 5 is a transverse vertical section taken in the plane of the line 5—5, Fig. 4.

Fig. 6 is a horizontal section of a part of the apparatus taken in the plane of the line 6—6, Fig. 4.

Fig. 7 is a detail plan view of the saw extremity of the apparatus looking toward the side opposite that shown by Fig. 4.

Figs. 8, 9 and 10 are detail perspective views of parts of the apparatus shown by Fig. 4.

Referring to Figs. 1, 2 and 3, the numeral 5 designates a frame having side bars 6 terminating in handles or grips 7 and secured to an intermediate support 8. Rising from the support 8 are uprights 9, each having a cross arm 10 extending laterally equal distances from the upper end thereof, the two cross arms being horizontally disposed and presenting upper flat surfaces and formed with slots 11 in the ends to provide a rest for a motor 12 of any suitable form adjustably secured to the said arms by bolts 13 inserted through the slots 11. The slots 11 are of such length as to permit the motor to be shifted on the arms for a purpose which will be hereinafter more fully described. Beneath the motor a tubular bearing sleeve 14 extends through and slightly above and also depends below the support 8, said sleeve having flanges or securing means 15 bearing against the under side of the support 8. The opening 16 in the support through which the sleeve extends is of greater diameter than the sleeve, and the flange or securing means 15 is formed with elongated slots 17 through which bolts 18 are inserted to permit the sleeve to be adjusted on the support commensurately with the adjustment of the motor 12. A securing disk or flange 19 is also provided around the sleeve 14 a distance above the lower end of said sleeve and is opposed to a lower securing disk 20. A shaft 21 depends from the motor 12 through the sleeve 14 and is of materially less diameter than the sleeve, as clearly shown by Fig. 3, the lower end of the shaft also extending through a central opening 22 in a boss formed at the center of the securing disk 20, a key pin 23 being inserted through the boss and the lower end of the shaft. The lower extremity 24 of the sleeve 14 extending below the flange 19 bears upon the lower securing disk 20, and said flange 19 and disk 20 are connected by bolts 25 which also project through an annular frictional member or ring 26 constructed of suitable material, such as wood fiber or a frictional composition of different materials. The disks 19 and 20 and frictional ring or annulus 26 rotate together on the lower extremity of the sleeve 14 and the lower end of the shaft 21, the actuation of these parts from the shaft taking place through the lower disk 20. Secured to the inner side of the ring or annulus 26 is a suitable metal ring 27 having a ball race 28 therein, and secured to the outer portion of the lower extremity of the sleeve 24 is a similar metal ring 29 having a ball race 30 therein, a plurality of balls 31 being held in the races 28 and 30 to provide an anti-frictional means between the ring or annulus 26 and the lower extremity of the sleeve 14 and whereby the said ring or annulus and the parts connected thereto and operated by the shaft 21 will be very little worn and an easy running action of the said ring or annulus will take place.

Extending through the support 8 at a distance from the location of the sleeve 14 is a shaft 32 having a set collar 33 on its upper extremity bearing upon the said support 8 and to which an operating or shifting lever 34 is attached. The shaft 32 extends downwardly through the horizontal web or member 35 of a bearing hanger 36 which has a rear vertical wall or member 37 depending below the web or member 35 and formed with an opening 38 therethrough, as shown by Fig. 3. The lower extremity of the shaft 32 is secured to a top disk or eccentric head 39 having a central stub shaft 40 depending therefrom and through a lower retaining washer or disk 41, a nut or analogous securing device 42 being applied to the lower end of the said shaft 40. The stub shaft 40 extends centrally through a hub 43 which is integral with the eccentric head 39 and secured to said hub is a bearing annulus 44. Surrounding the bearing annulus 44 is a friction disk 45 and between the said annulus 44 and disk 45 a plurality of anti-frictional balls 46 are mounted to provide for an easy running or free rotation of the friction annulus 45 relatively to the parts supporting the same as hereinbefore explained. The friction annulus 45 extends through the opening 38 in the inner wall or member 37 of the hanger 36 and also through an opening 47 in a saw-supporting plate or hanger 48 secured at its upper end to the lower portion of the wall or member 37 of the hanger 36, the openings 38 and 47 being in alinement and permitting the friction annulus 45 to freely move therein. The saw support or hanger 48 has a circular saw 49 rotatably held thereon by a central arbor or pivot means 50, the combined thickness of the support or hanger 48 and the saw 49 being less than the lateral set of the teeth 51 of the saw and whereby the saw and the greater portion of the support or hanger 48 will be permitted to enter the cut or kerf formed by the said saw teeth without obstruction to the free cutting action of the circular saw. The upper part of the circular saw is engaged at one side by the friction annulus 45 and at the opposite side by the friction ring or annulus 26 of the driving wheel of which said ring or annulus 26 forms a part. The friction annulus 45 may have its pressure varied relatively to the saw by operating the lever 34 which, through the eccentricity of the mounting of the said friction annulus 45 and the parts directly engaged thereby, may be moved slightly away from or in tighter engagement with the saw. From Fig. 3 it will be seen that the frictional driving annulus 26 engages the saw at a point directly opposite the engagement of the friction annulus 45 with the said saw and thus the saw is tightly held to obtain the full driving force and effect of the driving annulus 26 when it is desired to operate the saw. The driving annulus 26 continues to rotate as long as the motor 12 is in operation and actuates the shaft 21, and rotation of the annulus 45 is due to the engagement thereof with the rotating saw 49, and as soon as the said annulus 45 is released from full engagement with the saw 49, the latter will lose its effective cutting power by reason of the slack engagement that will ensue relatively to the driving annulus 26 of the driving mechanism. To compensate for wear, the driving annulus 26 and the parts directly associated therewith, including the sleeve 14 and the motor 12, may be adjusted through the medium of the slots 11 and 17 simply by loosening the bolts 13 and 18 and subsequently the parts may be retained in adjusted position by re-tightening the said bolts.

The saw 49 is a continuous disk or is solid from the center to the periphery, and the form of support or hanger 48 therefor supports the saw in its operation and prevents intermediate bending or distortion thereof and generally reinforces the saw in its operation. To regulate the depth of cut of the saw or to prevent the latter from striking on the ground surface or engaging devices that may be under the log or wood cut after the saw passes through the wood, a gage or depth-cutting regulating means is provided and consists in one form of a bar 52 held in horizontal position and extending longitudinally across the plane of the upper portion of the saw but out of contact with relation to the latter, said bar having a link 53 pivoted thereto and to the adjacent side bar 6 at one extremity, and at the opposite extremity said bar has a second link 54 in like manner attached thereto and to the side bar and extended above said side bar in the form of an operating handle or grip 55 whereby the bar may be shifted to raise or lower the same relatively to the saw and the work being operated upon or the wood being cut. The lower edge of the bar 52 always presents a lower straight edge which will engage the log or wood being cut by the saw when a certain depth in the wood is reached by the saw and the saw is thereby prevented from forming a deeper cut in the log or wood than that permitted by the adjustment of the said bar 52.

The foregoing construction of the improved sawing apparatus is portable and may be moved manually from place to place and held applied to a log or a piece of timber to permit the saw to perform its cutting function. This form of the sawing apparatus may be held so as to dispose the saw 49 perpendicularly or horizontally or at any angle between the perpendicular and horizontal as the work may require.

In the construction shown by Figs. 4 to 10 inclusive, the same essential principle of the sawing apparatus is embodied as in the structure shown by Figs. 1, 2 and 3, with additions to render the improved apparatus applicable to a motor vehicle or other vehicle means embodying a motive device or engine, and in this modified form of the sawing apparatus the frictional driving means heretofore described and the frictional counteracting means eccentrically mounted, together with the saw support or hanger and saw, are, in all respects, similar to the structure shown in Figs. 1, 2 and 3, and similar reference characters are applied thereto. The frictional driving means or device in this instance, however, has a shaft 56 for actuating the same which is materially longer than the motor shaft 21 hereinbefore described, and from the intermediate support 8 arms 57 extend rearwardly any suitable distance and form with the said support a swinging frame having a universal movable attachment and operation relatively to an upright frame 58 in a manner which will be presently explained. The upright frame 58 is preferably composed of opposite side members 59 spaced apart and connected at the bottom, as at 60, and having an intermediate bearing 61. Above the bearing 61 a winding drum or windlass 62 is mounted between the members 59 and is operated through the medium of a shaft 63 and crank handle 64. Between the upper ends of the members 59 a grooved guide pulley 65 is mounted to freely turn and thereover a cable or rope 66 is trained and is attached at its lower end to an eye or apertured lug 67 secured to the support 8 and whereby the saw and its driving means as well as the support and the arms 57 may be raised and lowered as indicated by the dotted and full lines in Fig. 4. The cable or rope 66 is arranged to wind upon the drum or windlass 62 and suitable means will be provided to lock the said drum, its shaft 63, and crank handle 64 against movement when the desired adjustment has been made. The bearing 61 held by the members 59 of the upright frame supports a direction pulley or sheave 68 which is free to rotate, and thereover is trained a band or belt 69 engaging the drive pulley 70 of the engine or motor 71 shown in dotted lines by Fig. 4, said pulley 70 being mounted on the outer extremity of the engine or motor shaft 72. The motor vehicle, as shown in dotted lines by Fig. 4, is in the form of a traction engine, but the application of the improved sawing apparatus is not confined to such form of motor vehicle as it may be applied to an automobile or other similar vehicle having a motor capable of being utilized as the driving means for the improved apparatus. The upright frame 58 is held in supported relation to the body of the motor vehicle by a beam or beams or supports 73, as shown by Fig. 4, and whereby the entire apparatus may be readily transported from one point to another. During transportation, the arms 57, support 8, shaft 56, and the saw and direct driving and frictional means therefor may be raised or drawn up as close as possible to the upright frame 58 through the medium of the cable or rope 66 so as to be out of the way and avoid impeding transportation of the apparatus.

Extending through the space between the lower extremities of the members 59 of the upright frame 58 is an elongated bearing sleeve 74 having a motion transmitting shaft 75 mounted therein to freely rotate and connected at its outer extremity by any suitable universal coupling 76 to the rear end of the shaft 56 to permit angular adjustment of the latter shaft without interfering with its rotation. The bearing sleeve 74 projects some distance outwardly beyond the outer side of the upright frame 58, but at its rear extremity has a disk 77 formed as a part thereof and bearing against the rear sides or edges of the members 59 over the open space between the latter. The shaft 75 extends inwardly beyond the disk 77 a suitable distance and has a band wheel or pulley 78 keyed thereon and engaged by the band 69 which extends downwardly from the direction pulley or sheave 68 and then returns to the pulley 70, as clearly shown by Fig. 5. Over the outer end of the bearing sleeve 74 an angle support 79 is fitted, said support being shown in detail by Fig. 8 and embodying a rear disk-like member 80 with a central opening 81 snugly fitting over the bearing sleeve and also comprising a forwardly projecting plate or disk member 82 having a central opening 83 therein. To prevent the sleeve 74 and disk 77 from turning in the upright frame or between the members 59, the said sleeve has the rear portion thereof adjacent to the disk squared, as at 84 (see Fig. 9) to snugly fit in the open space between the said members 59 of the upright frame. The rear disk 80 of the angle support 79 is fitted over the bearing sleeve 74 and rests against the outer or front edges of the members 59 of the frame 58 and is secured in applied position through the medium of a set collar 85 also applied over the bearing disk 74 and held in fixed position by a set screw 86. When this set collar 85 is applied as shown by Fig. 4, the bearing sleeve 74 and disk 77 will be held in tight engagement with the parts of the frame 58 to which the bearing sleeve and disk are applied and, in like manner, the rear disk-like member 80 of the angle support 79 will be held tightly against the outer portion of the upright frame around the bearing sleeve 74. The rear disk-like member 80 of the angle support 79 though held in close relation to the upright frame 58 is free to turn on the bearing sleeve 74 to serve as a fulcrum means for the sawing apparatus and whereby the saw 49 may be disposed either in a perpendicular position, a horizontal plane, or at any angle between the horizontal and perpendicular in accordance with the character of the work to be performed or the wood or timber to be cut. To provide for upper and lower or vertical swinging movements of the sawing apparatus without modifying the primal driving mechanism and devices therefor, the arms 57 constituting part of the frame for the sawing apparatus are attached to projections 87 at opposite portions of a fulcrum disk or turn-head 88 which is fitted against the member 82 of the angle support 79, the disk 88 having an opening 89 therein which is of less diameter than the opening 83, and the pivot means for the disk 88, as clearly shown by Fig. 5, comprises a pivot bolt 90 with an inner flanged head 91 and an outer screw-threaded extremity to receive a nut 92 which is secured against a washer 93, the center of the disk 88 around the opening 89 having a boss or hub 94 to rotatably fit in the opening 83 of the member 82. The fulcrum disk 88 is thus mounted to freely swing upwardly and downwardly or oscillate on the member 82 of the angle support 79, and the said disk with the arms 57 and sawing apparatus carried by these arms, together with the member 82 and member 80 of the angle support, are free to swing as a whole in opposite lateral directions on the bearing sleeve 74, and by this means the supporting frame for the saw, including the arms 57 and the saw together with its direct driving means, may be turned into a horizontal plane or at any angle between the horizontal and perpendicular as heretofore explained. It will be seen that this universal fulcrum or coupling means for the saw apparatus may be easily applied to or detached from the upright frame 58, and, owing to the universal shaft coupling 76 between the shafts 56 and 75, the said shaft 56 may be operated in a positive manner without interfering in the least with the drive of the saw 49 when the latter is elevated above or below a horizontal plane as the work may require, or, during transportation of the apparatus on the motor vehicle from one point to another. The gage means for regulating the depth of cut of the saw is also present in the modified form of the sawing apparatus as just explained and consists of the cable 66, so that both forms of the improved device are equipped with means for controlling the depth of cut of the saw into the timber or wood as may be found necessary and desirable. All the parts of the improved sawing apparatus are strong and durable, and the most essential feature is the concentration of the driving power of the saw through frictional means adjacent to the periphery or cutting edge of the saw and permitting an ordinary form of circular saw to be used and whereby saws of different sizes found on the market may be readily utilized with material advantage in the assemblage of parts of the mechanism or apparatus and in the cost of manufacture. Moreover, in the event that the saw becomes broken or worn out, it may be readily replaced by a new saw without requiring a special construction of saw.

What is claimed is:

1. In a sawing apparatus, a circular saw, hanger means for operatively supporting the saw and engaging over one side of the latter to a point beyond the center of the same to hold a bearing for the saw, the hanger and saw having a combined thickness less than the lateral set of the teeth of the saw whereby the saw and the greater portion of the hanger will be free to enter the kerf formed by the saw teeth without obstruction to the cutting action of the saw, a rotary friction driving means engaging one side of the saw near the teeth thereof, and mechanism for sustaining and bracing the saw in operative position and for actuating the driving means.

2. In a sawing apparatus, a circular saw, means for operatively supporting the saw including a hanger having an arbor engaging the center of the saw, the hanger extending solely over one side of the saw, and slightly beyond the center of the latter and the saw and hanger of less thickness than the lateral set of the saw teeth to permit a portion of the hanger to unobstructedly enter the kerf made by the saw, frictional driving means engaging the inner portion of the saw near the periphery thereof, the saw and the hanger projecting in advance of the remaining parts of the apparatus for clear action, and mechanism for operating the frictional driving means.

3. In a sawing apparatus, a circular saw, means for operatively supporting the saw including a hanger disposed closely against one side of the saw and reinforcing the latter, the hanger having an arbor engaging the center of the saw, the combined thickness of the saw and hanger being less than the lateral set of the saw teeth and the greater portion of the hanger and saw being in advance and clear of the remaining parts of the apparatus to permit the hanger to unobstructedly enter the kerf made by the saw, and mechanism for operating the saw.

4. In a sawing apparatus, a circular saw, means for operatively supporting the saw in the clear in advance of the remaining parts of the apparatus and disposing the saw so that it may be directly applied to timber or wood to be cut thereby, said means including a hanger having an arbor engaging the center of the saw, means for driving the saw located at the inner portion of the latter, mechanism for operating the driving means, and a longitudinally shiftable swinging bar movable toward and away from the supporting means for the saw adjacent to one side of the latter for regulating the depth of cut of the saw.

In testimony whereof I have hereunto set my hand in presence of two subscribing witnesses.

CEPHAS V. FITE.

Witnesses:
C. A. DANFORTH,
W. E. OUTEN.